UNITED STATES PATENT OFFICE.

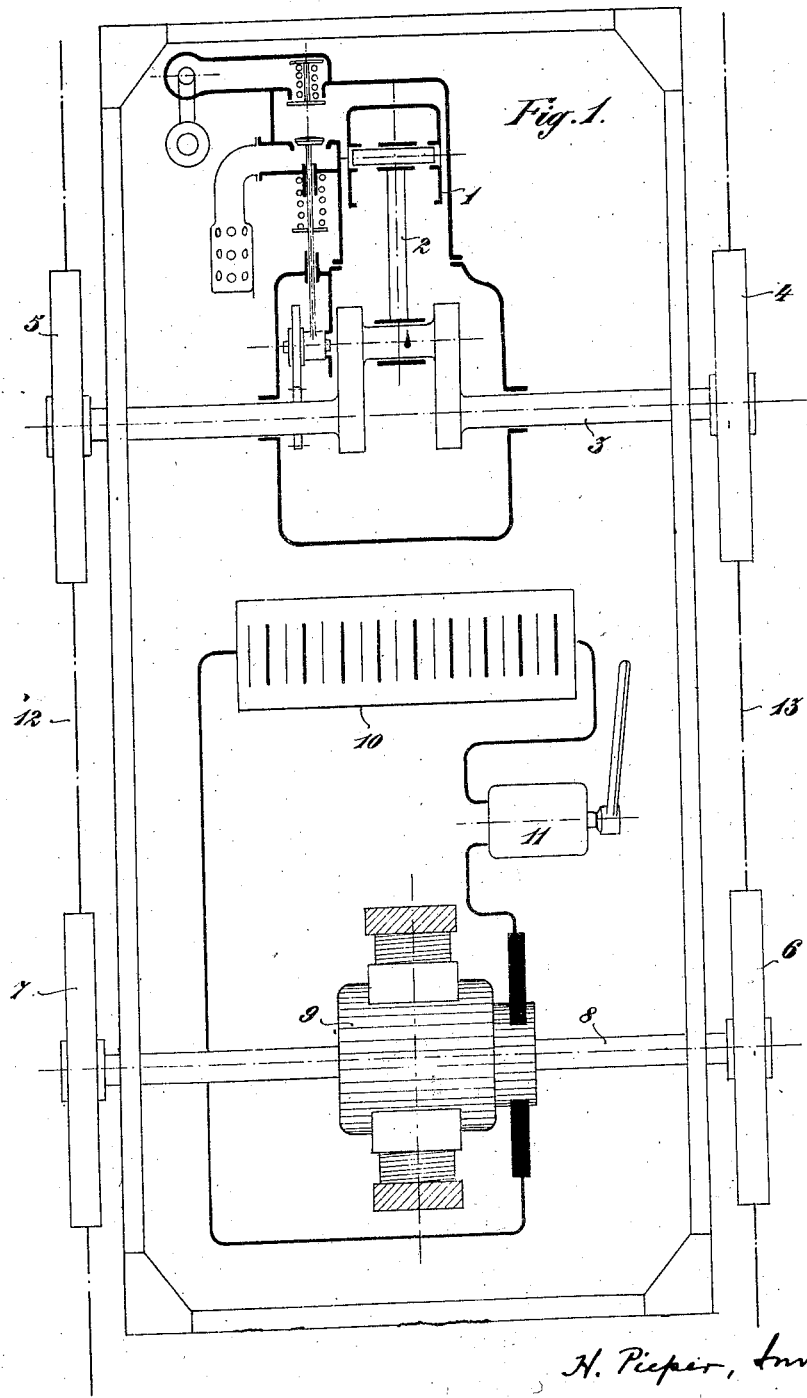

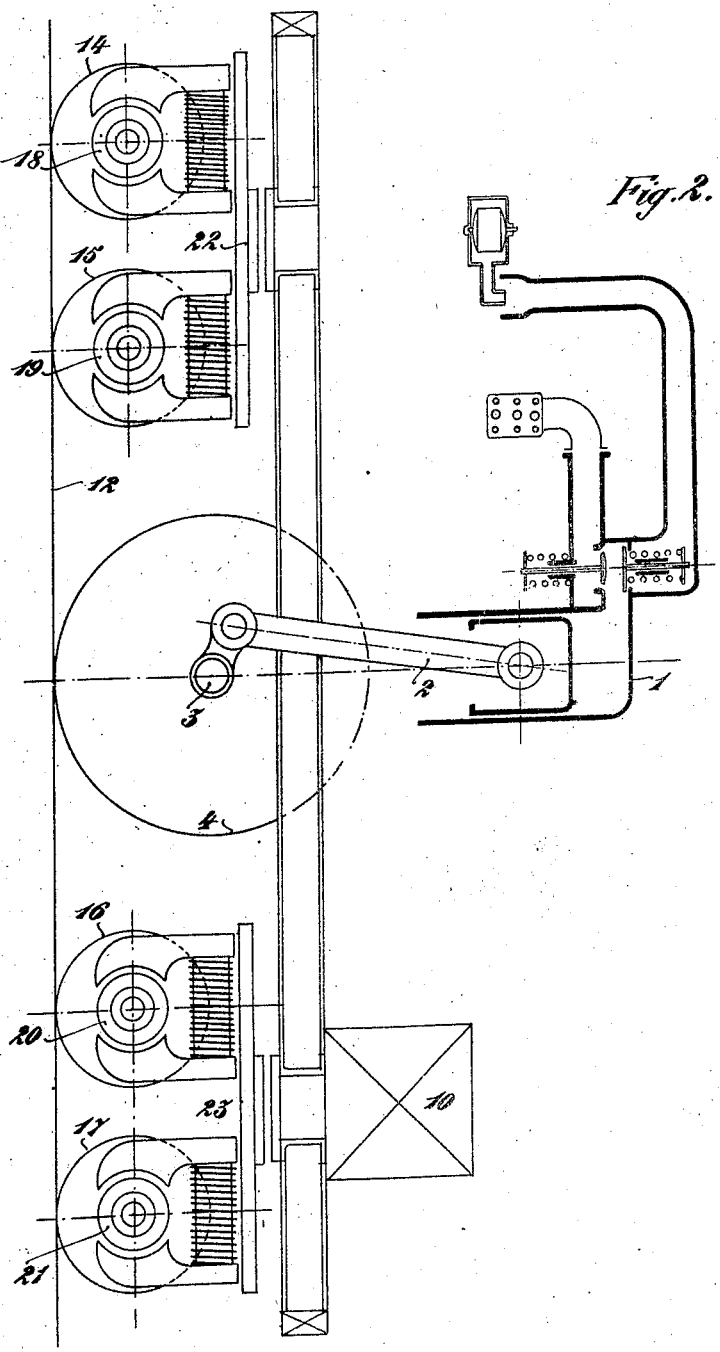

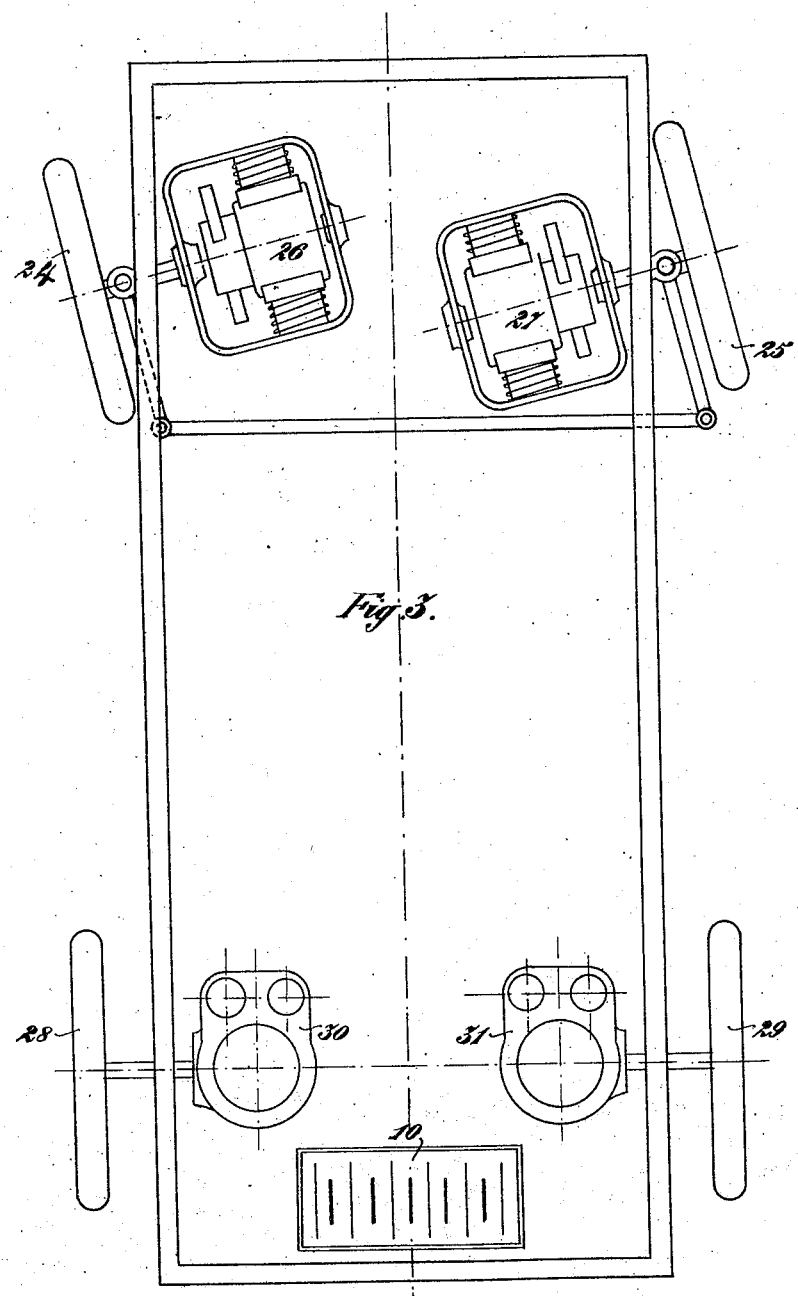

HENRI PIEPER, LIEGE, BELGIUM.

MOTOR-VEHICLE.

937,859. Specification of Letters Patent. Patented Oct. 26, 1909.

Application filed January 25, 1907. Serial No. 353,975.

*To all whom it may concern:*

Be it known that I, HENRI PIEPER, a subject of the King of Belgium, residing at Liege, Belgium, have invented certain new and useful Improvements in Motor-Vehicles, of which the following is a specification, reference being had to the drawings accompanying and forming a part of the same.

My invention relates to motor vehicles, and more specifically to those operating on the "mixed" principle, which, in general, involve the combination of an internal combustion or similar engine, a dynamo-motor, and a secondary battery, the engine and dynamo-motor being at all times coupled together and the battery in circuit with the latter. The operation of a vehicle of this character is well understood to be as follows:—First the dynamo is started as a motor by current from the secondary battery. Motion is in this way imparted to the engine which is thus started in operation, and, when its power increases to a certain degree, drives the dynamo as a generator, any excess of power being stored as electrical energy in the battery until the counter electromotive force of the latter exceeds the electromotive force of the dynamo, when it again absorbs energy and runs as a motor to assist the engine. By this system the speed of the vehicle is automatically regulated while the stored energy in the battery is at all times available to start and to back the vehicle. In vehicles equipped with this system heretofore, the engine and dynamo-motor have been rigidly coupled by means of a shaft, but as the combined length of the set comprising the engine and dynamo-motor is greater than the practical width of the vehicle, a direct drive of the latter is not possible. This is a disadvantage, particularly in the case of high power vehicles, in which, as is well known, increased power of that obtainable with a given diameter of cylinder, can only be secured by increasing the number of cylinders. A further objection to the system as heretofore applied, resides in the necessity for using bevel gears as the means of transmitting the power.

The object of my present invention is to provide for a direct drive in all kinds of self-propelled or motor vehicles of the class hereinbefore referred to, and to so construct and arrange the same that either or both the engine and the dynamo-motor may occupy the entire width of the vehicle if so desired.

To this end my invention consists in connecting the engine to the dynamo-motor by means of the rails or the surface over which the vehicle travels, or by which it is supported, and thus to avoid the use of a connecting shaft or direct coupling, while still maintaining the two elements in constant connection and inter-dependent, but solely through the surface connection.

My improvements are illustrated in the accompanying drawings, in which—

Figure 1 is a partly diagrammatic and plan view of the application of the same to a rail motor vehicle. Fig. 2 shows in elevation and diagram a modification of the invention as applied to a rail motor vehicle, and Fig. 3 is a similar view partly in elevation of a road motor vehicle.

In carrying my invention into effect, as applied to a rail vehicle, I mount the engine, shown in this instance in Fig. 1 as a single cylinder engine, so that its piston rod 2 operates the crank shaft 3 of the wheels 4 and 5. On the shaft 8 of the other wheels 6 and 7 is mounted the dynamo-motor, which may be of suitable form of shunt wound dynamo, and in series therewith is the secondary battery 10 and a controller 11 arranged in the usual manner to effect forward or reverse rotation of the dynamo at such speeds as may be desired. It will thus be seen that the only connection between the engine and the dynamo-motor is through the rails 12 and 13.

With reference to the arrangement illustrated in Fig. 2; the engine 1 drives the shaft 3 of the main pair of wheels 4. Through the rails 12 other pairs of wheels 14, 15, 16 and 17, suitably mounted in trucks 22 and 23, are connected to the main wheels 4 in the same manner as above described, and dynamo-motors 18 to 21 are mounted on the axles of wheels 14 to 17. Such an arrangement may be used to propel or draw a series of cars, if desired, and is especially adapted for heavy vehicles, or for service requiring frequent starting, rapid braking, and a moderate running power, because, among other reasons, at starting when maximum effort is required, four axles are drivers, while for normal running requiring less power, practically one axle only is driving.

The surface coupling of the engine and dynamo-motor in the case of a road vehicle is secured as shown in Fig. 3. Each wheel is directly connected to one element of a mixed set. For example wheels 24 and 25 which are preferably the front wheels, but which may be either the front or rear wheels, are on axles upon which are mounted the dynamo-motors 26 and 27 respectively, and the axles of wheels 28 and 29 are crank shafts driven by the pistons of the cylinders 30 and 31 respectively. The only connection between the engine and the dynamo-motors, however, is through the surface of the road, but when thus connected the operation of the system is similar to that above described.

Having now described my invention, what I claim is:

1. In a motor vehicle, the combination with an internal combustion engine connected with a driving wheel of the vehicle to drive the vehicle, of a dynamo-motor connected to another driving wheel of the vehicle to drive the vehicle and devoid of mechanical actuating connection with the engine save through the said driving wheels and the roadway on which the latter run, and a secondary battery connected with the dynamo-motor to deliver current to or receive current from the dynamo-motor according as the speed of the vehicle varies from a predetermined rate.

2. In a motor vehicle, the combination of a pair of driving wheels, internal combustion driving-means connected to said wheels to drive the same, a pair of combined steering-and-driving wheels, dynamo-motors connected with the respective steering-and-driving wheels, said dynamo-motors being movable each with its respective steering-and-driving wheel in the steering movement thereof and devoid of mechanical actuating connection with the said internal-combustion driving-means save through the roadway on which the vehicle runs, and a secondary battery connected with the dynamo-motors to deliver current thereto or receive current therefrom according as the speed of the vehicle varies from a predetermined rate.

In testimony whereof I have signed my name to this specification in the presence of two subscribing witnesses.

HENRI PIEPER.

Witnesses:
LÉON MAGNÉE.
EMILE HEPTIA.